(12) United States Patent
Simmons et al.

(10) Patent No.: US 7,904,623 B2
(45) Date of Patent: Mar. 8, 2011

(54) ETHERNET CONTROLLER

(75) Inventors: Michael Simmons, Chandler, AZ (US);
Howard Henry Schlunder, Mesa, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 571 days.

(21) Appl. No.: 11/944,118

(22) Filed: Nov. 21, 2007

(65) Prior Publication Data

US 2009/0132742 A1 May 21, 2009

(51) Int. Cl.
*G06F 13/42* (2006.01)
(52) U.S. Cl. .............................. 710/106; 710/15; 710/105
(58) Field of Classification Search ........................ None
See application file for complete search history.

(56) References Cited

U.S. PATENT DOCUMENTS

| | | | |
|---|---|---|---|
| 6,175,865 B1 | 1/2001 | Dove et al. | 709/220 |
| 6,460,078 B1 | 10/2002 | Dove et al. | 709/220 |
| 2004/0039850 A1* | 2/2004 | Chen et al. | 710/1 |
| 2004/0198105 A1* | 10/2004 | Dove | 439/894 |
| 2005/0135413 A1* | 6/2005 | Yang et al. | 370/463 |
| 2006/0239183 A1* | 10/2006 | Robitaille et al. | 370/217 |
| 2008/0170582 A1* | 7/2008 | Wang et al. | 370/412 |

FOREIGN PATENT DOCUMENTS

| | | |
|---|---|---|
| EP | 1370030 A2 | 12/2003 |
| EP | 1494416 A2 | 1/2005 |
| WO | 0054419 | 9/2000 |

OTHER PUBLICATIONS

International Search Report for PCT/US2008/084382, mailed Jun. 9, 2009 (5 pages).

* cited by examiner

*Primary Examiner* — Chi H Pham
*Assistant Examiner* — Kouroush Mohebbi
(74) *Attorney, Agent, or Firm* — King & Spalding L.L.P.

(57) ABSTRACT

An Ethernet controller semiconductor chip has a system control unit, a media access control layer coupled with the system control unit, a physical layer coupled with the media access control layer, wherein the physical layer comprises a receiving port and a transmitting port, a switch control unit for providing a control signal for auto media device interface switching, and a plurality of external pins, wherein four pins are coupled with the receiving and transmitting port of the physical layer and one pin is coupled with the switch control unit for providing external access to the control signal for auto media device interface switching.

14 Claims, 5 Drawing Sheets

ETHERNET CONTROLLER

TECHNICAL FIELD

The technical field of the present application relates to Ethernet controllers.

BACKGROUND

Ethernet controllers, in particular stand alone Ethernet Controllers, are designed to serve as an Ethernet network interface for any type of microprocessor or microcontroller. Such a controller may include a dedicated interface for the microprocessor or microcontroller such as a serial peripheral interface (SPI) bus. In some embodiments, such an Ethernet controller may also be integrated in a microcontroller. The Ethernet controller handles all communication protocols and comprises a large buffer for intermediate storage of incoming and outgoing messages. The stand alone or integrated Ethernet controller handles coordination of incoming and outgoing data packets as well as packet filtering. A microcontroller or microprocessor may communicate and control the Ethernet controller via an SPI interface or any other interface. On the Ethernet side of the controller, a stand alone Ethernet controller may have the standard twisted pair connections or so-called media dependent interface (MDI) for transmitting and receiving Ethernet protocol information. The Ethernet ports are then coupled to an RJ-45 or respective connector depending on the interface. Because receiving port or transmitting port of the external connection may be in either physical location of the RJ-45 connector, two different type of cables exist for external connection, a standard cable for straight coupling of two Ethernet cables (MDI) and a cross over cable for cross connection of two Ethernet cables (MDIX). With many standard devices, a user needs to know which cable to use.

However, many devices that comprise an Ethernet interface such as personal computers, routers, etc. comprise within the Ethernet interface a so-called autoswitch-MDIX device which allows for use of either the standard cable or the crossover cable. The requirements for an autoswitch-MDIX functionality are standardized in IEEE 802.3-2005 Standard, Section 40.4.4. The auto-switch unit automatically detects which connection cable has been used and switches the ports accordingly. Different types of Ethernet semiconductor chips need to be used in designing Ethernet devices with and without autoswitch capabilities. Hence a manufacturer may be forced to design two different types of each device if he wants to sell different versions of a device and keep different semiconductor chips in stock for manufacturing the devices. Hence a need for a more flexible design of Ethernet semiconductor chips exists.

SUMMARY

According to an embodiment, an Ethernet controller semiconductor chip may comprise a system control unit, a media access control layer coupled with the system control unit, a physical layer coupled with the media access control layer, wherein the physical layer comprises a receiving port and a transmitting port, a switch control unit for providing a control signal for auto media device interface switching, and a plurality of external pins, wherein a first set of pins, for example four pins, are coupled with the receiving and transmitting port of the physical layer and one pin is coupled with the switch control unit for providing external access to the control signal for auto media device interface switching.

According to a further embodiment, the switch control unit may comprise a sample timer controlling a shift register and timer having a high variability. According to a further embodiment, the timer having a high variability may comprise a first timer clocked by a low variability clock signal and a second timer clocked by a high variability clock signal and a first comparator coupled with the first timer and a first register and a second comparator coupled with the second timer and a second register, wherein the output of the first comparator triggers the second counter and the output of the second comparator generates the timer output signal with high variability. According to a further embodiment, the timer having a high variability may comprise a first timer clocked by a low variability clock signal and a second timer clocked by a high variability clock signal and a first comparator coupled with the first timer and a first register and a second comparator coupled with the second timer and a second register, wherein the output of the second comparator triggers the first counter and the output of the first comparator generates the timer output signal with high variability.

According to another embodiment, a method of using an Ethernet controller semiconductor chip may comprise a system control unit, a media access control layer coupled with the system control unit, a physical layer coupled with the media access control layer, wherein the physical layer comprises a receiving port and a transmitting port, a switch control unit for providing a control signal for auto media device interface switching, a plurality of external pins, wherein a first set of pins, for example four pins, are coupled with the receiving and transmitting port of the physical layer and one pin is coupled with the switch control unit for providing external access to the control signal for auto media device interface switching, the method may comprise the steps of: providing a printed circuit board with said Ethernet controller semiconductor chip; directly coupling the four pins with of the Ethernet controller semiconductor chip with a connector, for example an RJ-45 connector; and leaving the one pin of the Ethernet controller semiconductor chip unconnected.

According to another embodiment, a method of using an Ethernet controller semiconductor chip may comprise a system control unit, a media access control layer coupled with the system control unit, a physical layer coupled with the media access control layer, wherein the physical layer comprises a receiving port and a transmitting port, a switch control unit for providing a control signal for auto media device interface switching, a plurality of external pins, wherein a first set of pins, for example four pins, are coupled with the receiving and transmitting port of the physical layer and one pin is coupled with the switch control unit for providing external access to the control signal for auto media device interface switching, wherein the method may comprise the steps of: providing a printed circuit board with said Ethernet controller semiconductor chip; providing a switching device having a control input on the printed circuit board and connecting the switching device between the four pins with of the Ethernet controller semiconductor chip and a connector, for example an RJ-45 connector; and connecting the control input of the switching device with the one pin of the Ethernet controller semiconductor chip.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein:

FIG. 2b illustrates a second application of the same embodiment of an Ethernet controller as shown in FIG. 2a;

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

Figure 1:
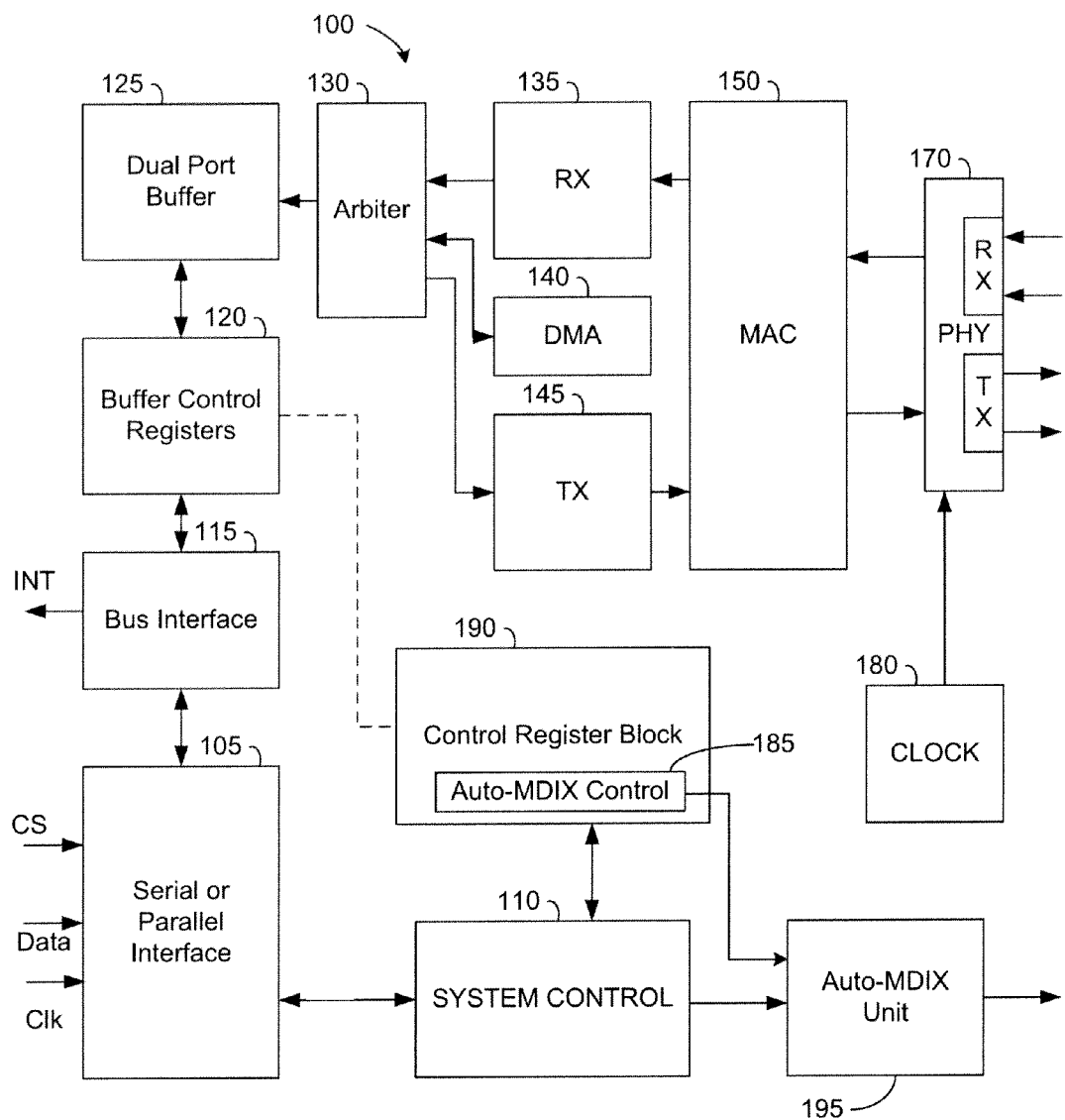
FIG. 1 is a block diagram of an Ethernet controller module as used in a stand alone Ethernet controller or an integrated module for a microcontroller.

FIG. 1 shows as an embodiment a block diagram of an Ethernet controller 100 that can be a stand alone Ethernet controller semiconductor chip or an Ethernet controller module integrated, for example, in a microcontroller. The Ethernet controller 100 comprises a typical physical layer (PHY) 170 with transmit and receive units TX and RX for transmitting and receiving of the actual analog data over the network. This physical layer 170 is coupled with a media access control (MAC) data link layer 150 for implementing the actual Ethernet standard (IEEE 802.3). The Mac layer 150 is coupled with a receive unit 135 and a transmit unit 145 which may include respective filter units flow control and host interfaces. The Ethernet controller may also include a direct memory access (DMA) controller 140 capable of performing, for example, a checksum evaluation. An arbiter 130 may be implemented to switch coupling between the actual buffer 125 and the modules 135, 140, and 145. The buffer can be designed as a dual port buffer and, thus, also provides access by control registers to allow for interfaces with limited address capabilities to access the full range of the buffer. To this end, a plurality of address and data registers 120 may be provided to indirectly address the buffer 125. The buffer control registers 120 can be coupled with a bus interface 115 and a serial or parallel input/output (I/O) interface 105. The serial I/O interface can be, for example, a SPI interface or any other suitable inter circuit interface. Therefore, the I/O interface may comprise, for example, a chip select input pin CS, one or more data input/output pins, and a clock input pin. The bus interface 115 may also provide for additional interrupt signals to provide for additional control of the Ethernet controller 100.

The Ethernet controller 100 may be internally controlled by a system control unit 110 which controls the respective units of the Ethernet controller 100. Furthermore, a plurality of control registers 190 can be provided which are accessible through the interface 105 as will be explained in more detail below. Buffer access registers 120 can be a part of the control registers 190 (CRB) as indicated by the dotted line. Also, the MAC layer may include further registers that can be accessed through registers in the CRB.

According to an embodiment, the Ethernet controller 100 may include an Auto-media dependent interface switch (MDIX) 195 coupled with the system control unit 110. The control register block may include a special function control register 185 for enabling the auto-MDIX unit.

System control unit 110 receives commands (opcodes) from the serial or parallel interface 105 and provides for decoding of these commands. The commands can provide for reading and writing of at least some or all registers thereby causing execution of certain functions of the respective controller. In particular, the system control 110 may provide for the respective control sequences to perform read and write access to the buffer 125 as will be explained in more detail below. Clock unit 180 provides for the required Ethernet transmission clock signal.

Figure 2A:
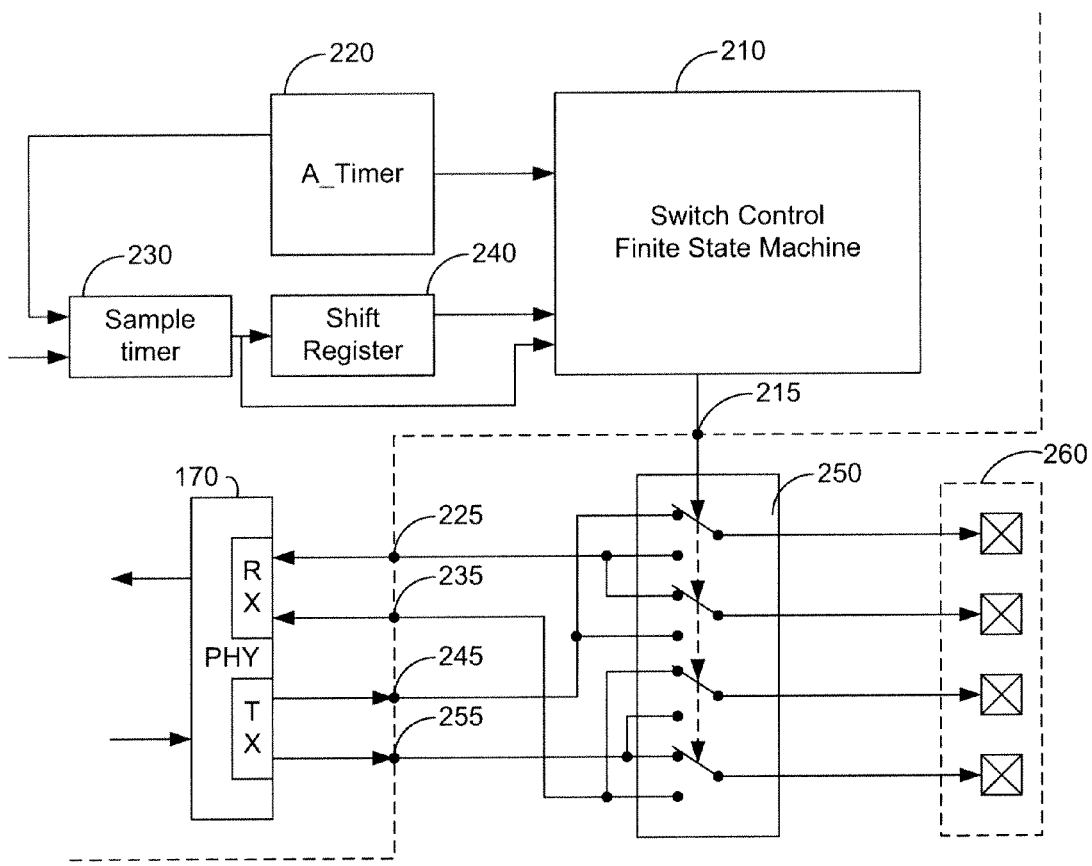
FIG. 2a illustrates a first application of an embodiment of an Ethernet controller.
Figure 2B:
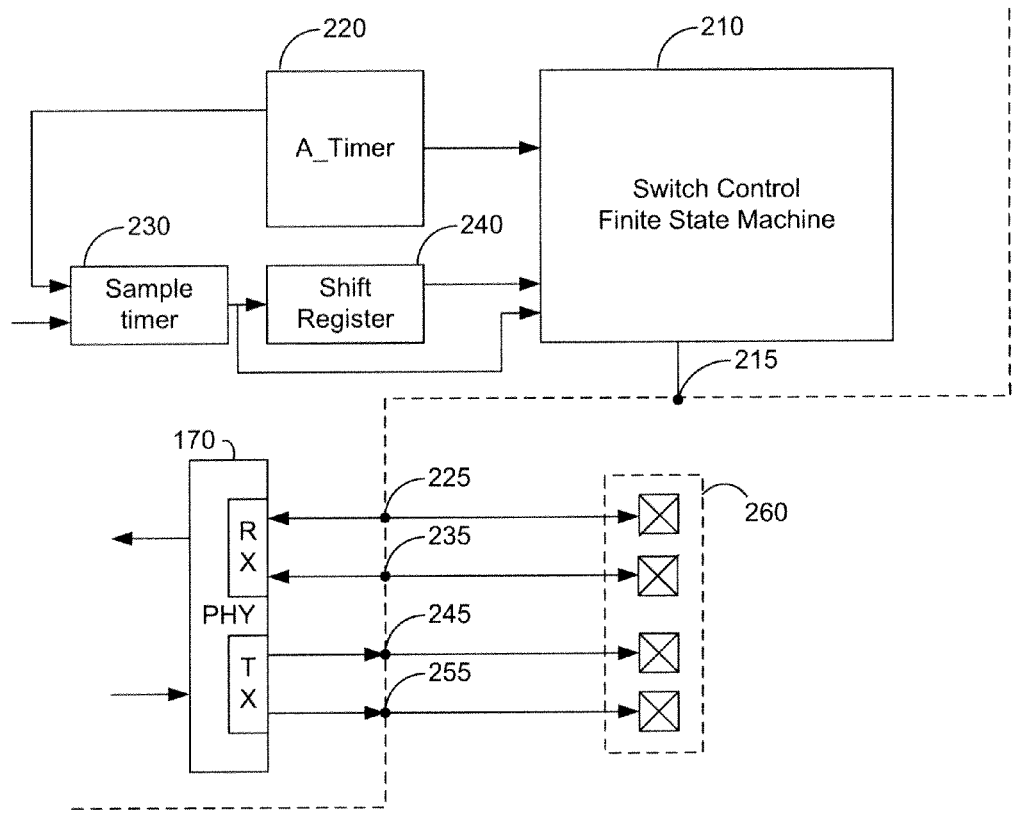

FIGS. 2a and 2b show certain details of a control logic for the auto-MDIX unit in an Ethernet controller chip and a first application of the Ethernet semiconductor chip 100. Ethernet semiconductor chip 100 may include a Switch Control Finite State Machine 210 (SCFSM) which is coupled with an external output pin 215 of Ethernet semiconductor chip 100. Switch Control Finite State Machine 210 receives various input signals from a so-called A-timer 220, a Sample Timer 230, and a Shift register 240 according to IEEE 802.3-2005 Standard, Section 40.4.4. To this end, the sample timer 230 receives the Ethernet clock signal and an output signal from A-Timer 220 and generates output signals for shift register 240 and SCFSM 210. Shift register 240 is also coupled with SCFSM 210. Furthermore, as shown in FIG. 1, the physical layer 170 is directly coupled with output pins 225, 235, 245, and 255 of Ethernet semiconductor chip 100. Output pins 225 and 235 are connected to the positive and negative connection node of the receive port and output pins 245 and 255 are connected to the positive and negative connection node of the transmitting port.

According to FIG. 2a, in a first application of the embodiment of Ethernet semiconductor chip 100, a device can be designed with autoswitch-MDIX capability by adding, for example, a CMOS switch 250 which coupled the external pins 225, 235, 245, and 255 of Ethernet semiconductor chip 100 with an RJ-45 connector 260. CMOS switch 250 is controlled through external pin 215 by respective control signal generated by SCFSM 210.

According to FIG. 2b, in a second application, the same Ethernet semiconductor chip 100 can also be used without the autoswitch-MDIX functionality by coupling output pins 225, 235, 245, and 255 of Ethernet semiconductor chip 100 directly with the RJ-45 connector. Hence, a printed circuit board (PCB) can be designed for both applications according to FIG. 2a and FIG. 2b wherein the same Ethernet controller semiconductor chip can be used. The PCB may then be equipped with an additional CMOS switch or not depending on the device design.

Figure 3:
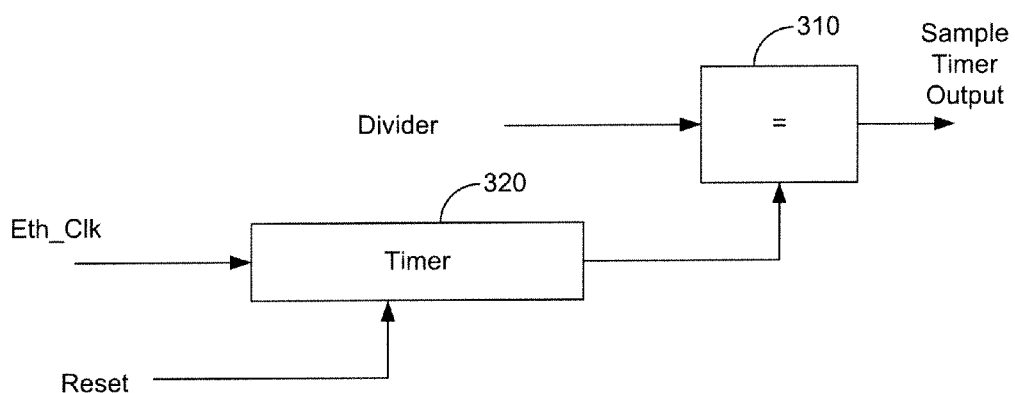
FIG. 3 shows an embodiment of the Sample Timer as used in FIG. 2.
Figure 4:
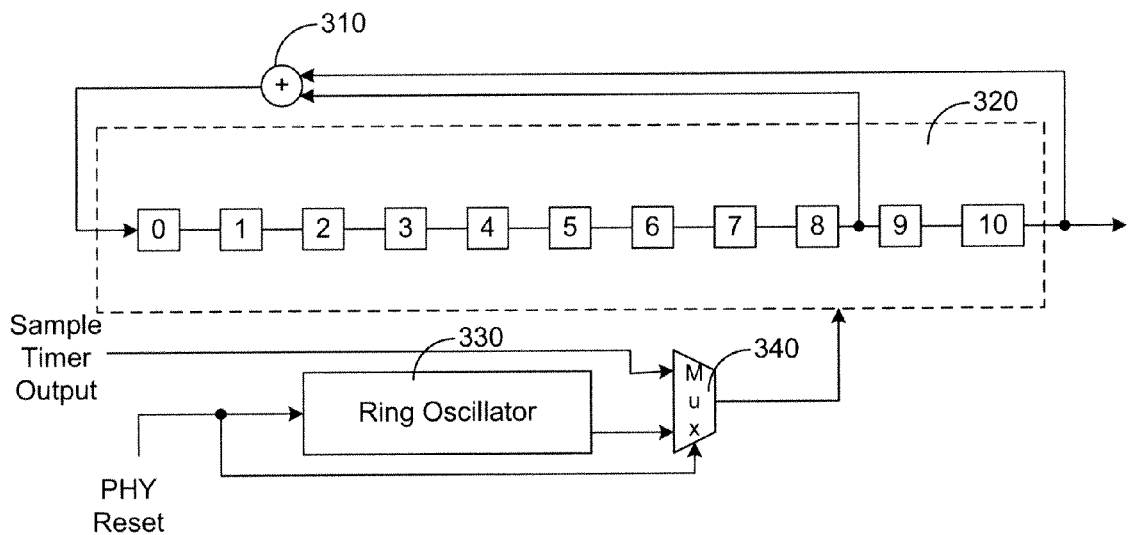
FIG. 4 shows an embodiment of the Shift Register as used in FIG. 2.

FIG. 3 shows an exemplary embodiment for the Sample Timer 230 as shown in FIGS. 2a and b. A timer 320 is clocked by the internal Ethernet clock of for example 25 MHz. The timer value is compared with a predefined value "Divider" by comparator 310 to generate an output signal with a timer period of 62 ms. According to the IEEE 802.3-2005 Standard, a 60-64 ms timer is used to determine the sample window during which a valid link may be established by the physical layer 170. There exists no requirement for randomness in this timer as the randomness will be provided by the shift register 240. This timer provides the clock for the SCFSM 210 and hence determines the time between possible switching of the switch polarities. The Sample Timer 320 is reset by the A_timer 220. this forces the timer to start running at the same time as the A_Timer 220.

The Shift register 240 is a 11-bit linear feedback shift register 320 (LFSR) used to generate a pseudo-random switching between MDI and MDIX mode. The feedback signals are tapped after register cells 8 and 10 and fed to a logic AND gate 310 whose output signal is fed to the input of the first register cell 0. Reset of this register is required to be pseudo-random and is therefore determined by allowing the register to be freely clocked by a ring oscillator 330 while the physical layer 190 is in reset. Once the physical layer's reset has completed, the ring oscillator 330 is disabled and the register is clocked on the rising edge of the "Sample Timer Output" signal generated by Sample Timer 230. The shift register 320 output signal is fed to the SCFSM 210 to decide when to switch from MDI to MDIX.

The A_timer 220 is a 0.975-1.625 s free-running timer that is used to "randomly" reset the Switch Control Finite State Machine. This reduces the probability that two Auto-MDIX nodes get into a lock-up situation where both nodes are switching between MDI and MDIX simultaneously. The A_Timer 220 may be implemented using an RC oscillator alone or a combination of an RC oscillator and a digital counter. To adjust variability of an oscillator different approaches are possible. The variability depends on the process technology. For example, 0.18 µm RC oscillators have a variability of about ±25% with about half of that due to Process, and half due to Voltage/Temp. In some applications nonvolatile memory and/or fuses may be used to store calibration data. An RC oscillator can be implemented with variations all due to temperature/voltage variation. With devices in close proximity, voltage/temperature variations are likely to be close.

Figure 5A:
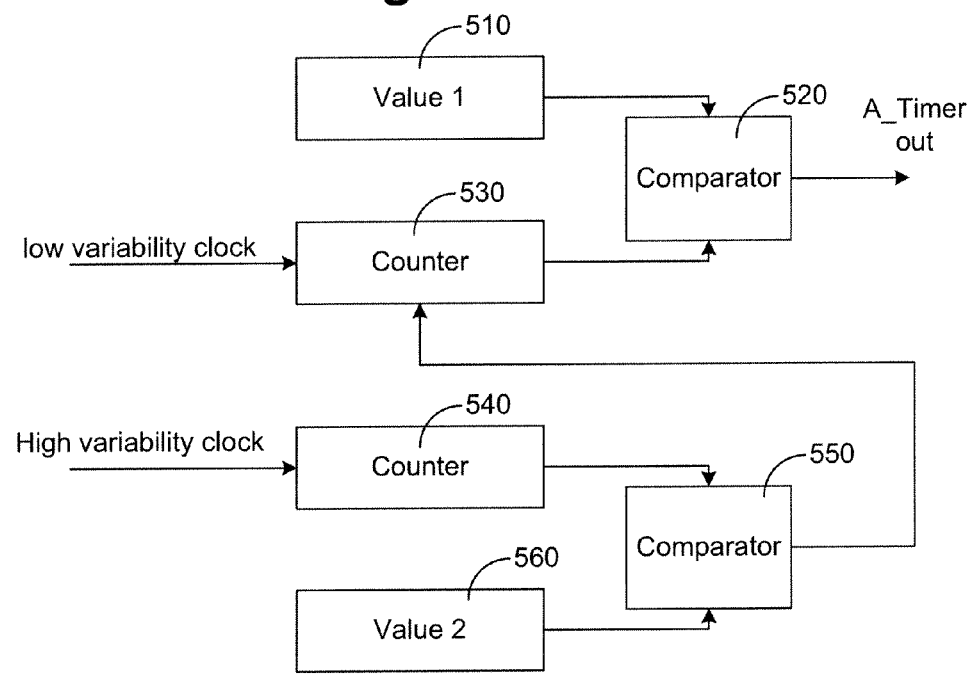
FIGS. 5a and b show two embodiments of the A_timer as used in FIG. 2.

FIG. 5a shows a first embodiment of an A_Timer using two different clock signals, a low variability clock and a high variability clock. The low variability clock may be the internal 25 MHz Ethernet clock whereas the high variability clock may be generated by an internal RC oscillator. Two comparators 520 and 550 are provided each comparing the output of one of the counters 530, 540 with a programmable register value 510, 560. Counter 540 is clocked by an internal RC oscillator with high variability. Once this timer 540 reaches a predefined first value stored in register 560, the output of comparator 550 triggers counter 530 which is clocked by the internal Ethernet clock of 25 MHz. Once this timer reaches a predefined second value stored in register 510, comparator 520 will output a pulse signal which is used as the A_timer output signal.

Figure 5B:
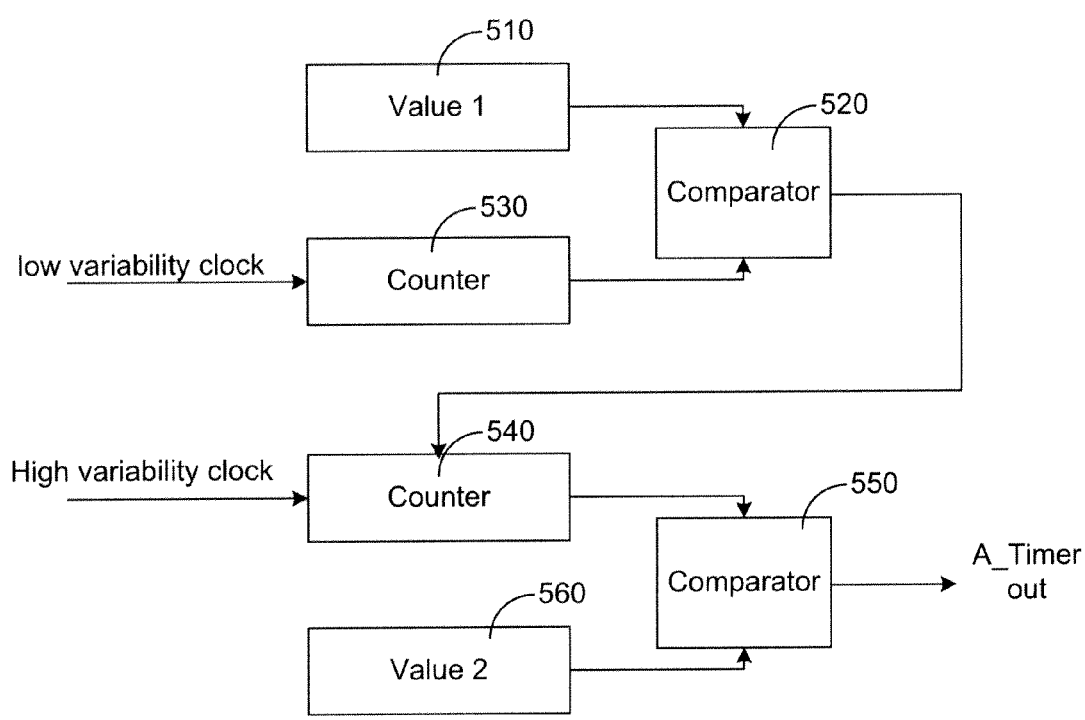

FIG. 5b shows the reverse configuration in a second embodiment. In this embodiment, comparator 520 generates the trigger signal for counter 540. Thus, comparator 550 generates the output signal of the A-timer. Through its programmability via registers 510 and 560, this arrangement is adjustable to process variations and to the variability of the RC oscillator.

What is claimed is:

1. An Ethernet controller semiconductor chip comprising an integrated circuit chip arranged in a housing having a plurality of external pins, the integrated circuit chip comprising:
    a system control unit;
    a media access control layer coupled with the system control unit;
    a physical layer coupled with the media access control layer, wherein the physical layer comprises a receiving port and a transmitting port;
    a switch control unit for providing a control signal for auto media device interface switching; and
    a special function register coupled with the switch control unit, wherein the special function register is programmable in a first mode in which the switch control unit is enabled to generate said control signal and in a second mode in which the switch control unit is disabled and no control signal is generated;
    wherein a first set of pins of the external pins are coupled with the receiving and transmitting port of the physical layer and one pin of the external pins is coupled with the switch control unit for providing external access to the control signal for auto media device interface switching.

2. The Ethernet controller according to claim 1, wherein the switch control unit comprises a sample timer controlling a shift register and timer having a high variability.

3. The Ethernet controller according to claim 2, wherein the timer having a high variability comprises a first timer clocked by a low variability clock signal and a second timer clocked by a high variability clock signal and a first comparator coupled with the first timer and a first register and a second comparator coupled with the second timer and a second register, wherein the output of the first comparator triggers the second counter and the output of the second comparator generates the timer output signal with high variability.

4. The Ethernet controller according to claim 2, wherein the timer having a high variability comprises a first timer clocked by a low variability clock signal and a second timer clocked by a high variability clock signal and a first comparator coupled with the first timer and a first register and a second comparator coupled with the second timer and a second register, wherein the output of the second comparator triggers the first counter and the output of the first comparator generates the timer output signal with high variability.

5. A method of using an Ethernet controller semiconductor chip comprising an integrated circuit chip arranged in a housing having a plurality of external pins, the integrated circuit chip comprising:
    a system control unit;
    a media access control layer coupled with the system control unit;
    a physical layer coupled with the media access control layer, wherein the physical layer comprises a receiving port and a transmitting port;
    a switch control unit for providing a control signal for auto media device interface switching; and
    a special function register coupled with the switch control unit, wherein the special function register is programmable in a first mode in which the switch control unit is enabled to generate said control signal and in a second mode in which the switch control unit is disabled and no control signal is generated;
    wherein a first set of pins of the external pins is coupled with the receiving and transmitting port of the physical layer and one pin of the external pins is coupled with the switch control unit for providing external access to the control signal for auto media device interface switching;
    the method comprising:
        providing a printed circuit board with said Ethernet controller semiconductor chip;
        directly coupling the first set of pins with of the Ethernet controller semiconductor chip with a connector; and
        leaving the one pin of the Ethernet controller semiconductor chip unconnected; and programming said special function register to be in the second mode.

6. The method according to claim 5, wherein the first set of pins comprises four pins.

7. The method according to claim 6, wherein the connector is an RJ-45 connector.

8. A method of using an Ethernet controller semiconductor chip comprising an integrated circuit chip arranged in a housing having a plurality of external pins, the integrated circuit chip comprising:
- a system control unit;
- a media access control layer coupled with the system control unit;
- a physical layer coupled with the media access control layer, wherein the physical layer comprises a receiving port and a transmitting port;
- a switch control unit for providing a control signal for auto media device interface switching; and
- a special function register coupled with the switch control unit, wherein the special function register is programmable in a first mode in which the switch control unit is enabled to generate said control signal and in a second mode in which the switch control unit is disabled and no control signal is generated;
- wherein a first set of pins of the external pins is coupled with the receiving and transmitting port of the physical layer and one pin of the external pins is coupled with the switch control unit for providing external access to the control signal for auto media device interface switching;

the method comprising:
- providing a printed circuit board with said Ethernet controller semiconductor chip;
- providing a switching device having a control input on the printed circuit board and connecting the switching device between the four pins with of the Ethernet controller semiconductor chip and an RJ-45 connector; and
- connecting the control input of the switching device with the one pin of the Ethernet controller semiconductor chip; and
- programming said special function register to be in the first mode.

9. The method according to claim 8, wherein the first set of pins comprises four pins.

10. The method according to claim 9, wherein the connector is an RJ-45 connector.

11. An Ethernet controller semiconductor chip comprising:
- a system control unit;
- a media access control layer coupled with the system control unit;
- a physical layer coupled with the media access control layer, wherein the physical layer comprises a receiving port and a transmitting port; and
- a switch control unit for providing a control signal for auto media device interface switching, the switch control unit comprising a sample timer controlling a shift register and timer having a high variability;
- wherein the timer having a high variability comprises a first timer clocked by a low variability clock signal and a second timer clocked by a high variability clock signal and a first comparator coupled with the first timer and a first register and a second comparator coupled with the second timer and a second register, wherein the output of the first comparator triggers the second counter and the output of the second comparator generates the timer output signal with high variability.

12. The Ethernet controller according to claim 11, further comprising a plurality of external pins, wherein a first set of pins are coupled with the receiving and transmitting port of the physical layer and one pin is coupled with the switch control unit for providing external access to the control signal for auto media device interface switching.

13. An Ethernet controller semiconductor chip comprising:
- a system control unit;
- a media access control layer coupled with the system control unit;
- a physical layer coupled with the media access control layer, wherein the physical layer comprises a receiving port and a transmitting port; and
- a switch control unit for providing a control signal for auto media device interface switching, the switch control unit comprising a sample timer controlling a shift register and timer having a high variability; wherein the timer having a high variability comprises a first timer clocked by a low variability clock signal and a second timer clocked by a high variability clock signal and a first comparator coupled with the first timer and a first register and a second comparator coupled with the second timer and a second register, wherein the output of the second comparator triggers the first counter and the output of the first comparator generates the timer output signal with high variability.

14. The Ethernet controller according to claim 13, further comprising a plurality of external pins, wherein a first set of pins are coupled with the receiving and transmitting port of the physical layer and one pin is coupled with the switch control unit for providing external access to the control signal for auto media device interface switching.

* * * * *